US012734891B2

(12) United States Patent
Kido

(10) Patent No.: US 12,734,891 B2
(45) Date of Patent: Sep. 15, 2026

(54) VEHICLE CONTROL DEVICE AND VEHICLE CONTROL METHOD

(71) Applicant: HONDA MOTOR CO., LTD., Tokyo (JP)

(72) Inventor: Hirotsune Kido, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/892,938

(22) Filed: Sep. 23, 2024

(65) Prior Publication Data

US 2025/0115132 A1 Apr. 10, 2025

(30) Foreign Application Priority Data

Oct. 10, 2023 (CN) ......................... 202311313744.4

(51) Int. Cl.
*B60L 3/00* (2019.01)
*B60L 15/20* (2006.01)
(Continued)

(52) U.S. Cl.
CPC ............. *B60L 3/0053* (2013.01); *B60L 15/20* (2013.01); *B60L 58/30* (2019.02); *B60L 50/75* (2019.02);
(Continued)

(58) Field of Classification Search
CPC ........ B60L 3/0053; B60L 15/20; B60L 58/30; B60L 50/75; B60L 58/40; B60L 2220/42; B60L 2240/423
(Continued)

(56) References Cited

U.S. PATENT DOCUMENTS

2001/0008192 A1* 7/2001 Morisawa .............. B60K 28/16
180/165
2009/0029213 A1* 1/2009 Murakami ............ H01M 8/043
429/421

(Continued)

FOREIGN PATENT DOCUMENTS

JP 2003-333707 11/2003
JP 2004-135371 4/2004

(Continued)

OTHER PUBLICATIONS

Japanese Office Action for Japanese Patent Application No. 2024-175912 mailed Apr. 1, 2026.

*Primary Examiner* — Jelani A Smith
*Assistant Examiner* — Dana D Ivey
(74) *Attorney, Agent, or Firm* — Amin, Turocy & Watson, LLP

(57) ABSTRACT

A vehicle control device includes a plurality of power unit mounted on a vehicle, and a processing part configured to control the power units. Each of the plurality of power units includes a rotating electric machine configured to exchange torque with driving wheels, a power storage device and a fuel cell that are power sources, and an electric power controller. The processing part controls an operation of a rotating electric machine in an abnormal power unit according to a state of charge of the power storage device, a rotation number of the rotating electric machine, and torque requirement of the vehicle in the abnormal power unit, when an abnormality of any fuel cell system occurs.

12 Claims, 3 Drawing Sheets

(51) Int. Cl.
*B60L 58/30* (2019.01)
*B60L 50/75* (2019.01)
*B60L 58/40* (2019.01)

(52) U.S. Cl.
CPC ........... *B60L 58/40* (2019.02); *B60L 2220/42* (2013.01); *B60L 2240/423* (2013.01)

(58) Field of Classification Search
USPC ............................................................ 701/22
See application file for complete search history.

(56) References Cited

U.S. PATENT DOCUMENTS

| | | | | |
|---|---|---|---|---|
| 2009/0068514 | A1* | 3/2009 | Aso | H01M 8/0488 429/444 |
| 2009/0205887 | A1 | 8/2009 | Tanaka | |
| 2010/0041285 | A1* | 2/2010 | Riggs | B63B 35/00 440/6 |
| 2012/0064424 | A1* | 3/2012 | Fuss | H01M 8/04835 429/431 |

FOREIGN PATENT DOCUMENTS

| | | |
|---|---|---|
| JP | 2007-014077 | 1/2007 |
| JP | 2016-144366 | 8/2016 |
| JP | 2022-129068 | 9/2022 |

* cited by examiner

VEHICLE CONTROL DEVICE AND VEHICLE CONTROL METHOD

CROSS-REFERENCE TO RELATED APPLICATION

Priority is claimed on Chinese Patent Application No. 202311313744.4, filed Oct. 10, 2023, the content of which is incorporated herein by reference.

BACKGROUND OF THE INVENTION

Field of the Invention

The present invention relates to a vehicle control device and a vehicle control method.

Description of Related Art

In recent years, efforts to realize a low-carbon or carbon-free society have become more active, and research and development are being conducted on electrification technology for vehicles to reduce $CO_2$ emissions and improve energy efficiency. In the related art, there are known electric vehicles in which, when power generation equipment of one of two parallel driving systems fails, distribution of torque requirements for the motors in the two driving systems is set according to a storage capacity of a battery in the failed driving system (for example, see Japanese Unexamined Patent Application, First Publication No. 2016-144366).

When driving such an electric vehicle, the distribution of a torque requirement to the motor in the failed driving system is reduced due to the reduced storage capacity of the battery in the failed driving system. Meanwhile, during braking, the target storage capacity of the battery in the failed driving system is increased above a normal level, enabling regenerative control of the motor.

SUMMARY OF THE INVENTION

Incidentally, in the technology related to the electrification technology, for example, the challenge is to ensure the desired traveling safety while maintaining the amount of electric power needed to drive the vehicle and auxiliary equipment even when the system malfunctions. For example, in the electric vehicle in the related technology, when the output shafts of the motors of the two driving systems are connected, if power to the motor is cut off in order to reduce electric power consumption in the failed driving system, a counter electromotive voltage may be generated due to the drag caused by the motor of a normal driving system. For example, when an excessive counter electromotive voltage is generated during high rotation of a normal motor, it may cause abnormalities in various electric power devices.

An aspect of the present application achieves increasing an available traveling distance in the event of an abnormality and ensuring desired traveling safety. Further, an aspect of the present application contributes to improvement of energy efficiency.

The present invention employs the following aspects.

(1) A vehicle control device (for example, a vehicle control device (10) in an embodiment) according to an aspect of the present invention includes a plurality of power units (for example, a power unit (11) in the embodiment) mounted on a vehicle (for example, a fuel cell vehicle (1) in the embodiment); and a controller (for example, a processing part (13) in the embodiment) configured to control the power units, each of the plurality of power units including: a rotating electric machine (for example, a first rotating electric machine (21*a*) and a second rotating electric machine (21*b*) in the embodiment) configured to exchange torque with wheels (for example, driving wheels (W) in the embodiment), a power storage device (for example, a first power storage device (25*a*) and a second power storage device (25*b*) in the embodiment) and a fuel cell (for example, a first fuel cell (23*a*) and a second fuel cell (23*b*) in the embodiment), which are power sources, and an electric power controller (for example, a first electric power controller (27*a*) and a second electric power controller (27*b*) in the embodiment) configured to control electric power transmission of the rotating electric machine, the power storage device and the fuel cell, and wherein the controller controls an operation of an abnormal rotating electric machine (for example, the first rotating electric machine (21*a*) or the second rotating electric machine (21*b*) in the embodiment), which is the rotating electric machine in the power unit having an the abnormal fuel cell, according to a state of charge (for example, a state of charge (SOC) in the embodiment) of the power storage device, a rotation number (for example, a rotation number (N) in the embodiment) of the rotating electric machine, and a torque requirement (for example, a torque requirement (TR) in the embodiment) of the vehicle in the power unit having the abnormal fuel cell, when an abnormality of the fuel cell occurs.

(2) In the vehicle control device according to the aspect of the above-mentioned (1), the controller may operate the abnormal rotating electric machine in a power mode when the rotation number is smaller than a predetermined rotation number (for example, a predetermined rotation number (Nt) in the embodiment), the torque requirement is equal to or greater than a predetermined torque (for example, a predetermined torque (Tt) in the embodiment), and the state of charge is equal to or greater than a predetermined state of charge (for example, a predetermined second state of charge (SOC2) in the embodiment), and wherein the controller may stop the abnormal rotating electric machine or reduce the torque of the abnormal rotating electric machine to zero when the rotation number is smaller than the predetermined rotation number, the torque requirement is equal to or greater than the predetermined torque, and the state of charge is smaller than the predetermined state of charge.

(3) In the vehicle control device according to the aspect of the above-mentioned (1), the controller may stop the abnormal rotating electric machine or reduce the torque of the abnormal rotating electric machine to zero when the rotation number is smaller than a predetermined rotation number (for example, a predetermined rotation number (Nt) in the embodiment), the torque requirement is smaller than a predetermined torque (for example, a predetermined torque (Tt) in the embodiment), and the state of charge is equal to or greater than a predetermined state of charge (for example, a predetermined third state of charge (SOC3) in the embodiment), and wherein the controller may operate the abnormal rotating electric machine in a regenerative mode when the rotation number is smaller than the predetermined rotation number, the torque requirement is smaller than the predetermined torque, and the state of charge is smaller than the predetermined state of charge.

(4) In the vehicle control device according to the aspect of the above-mentioned (1), the controller may operate the abnormal rotating electric machine in a power mode when the rotation number is smaller than a predetermined rotation number (for example, a predetermined rotation number (Nt)

in the embodiment), the torque requirement is equal to or greater than a predetermined torque (for example, a predetermined torque (Tt) in the embodiment), and the state of charge is equal to greater than a predetermined first state of charge (for example, a predetermined first state of charge (SOC1) in the embodiment), wherein the controller may stop the abnormal rotating electric machine or reduce the torque of the abnormal rotating electric machine to zero when the rotation number is smaller than the predetermined rotation number, the torque requirement is equal to or greater than the predetermined torque, and the state of charge is smaller than the predetermined first state of charge and is equal to or greater than a predetermined second state of charge (for example, a predetermined second state of charge (SOC2) in the embodiment) which is smaller than the predetermined first state of charge, wherein the controller may stop the abnormal rotating electric machine when the rotation number is smaller than the predetermined rotation number, the torque requirement is equal to or greater than the predetermined torque, and the state of charge is smaller than the predetermined second state of charge, wherein the controller may stop the abnormal rotating electric machine or reduce the torque of the abnormal rotating electric machine to zero when the rotation number is smaller than the predetermined rotation number, the torque requirement is smaller than the predetermined torque, and the state of charge is equal to or greater than a predetermined third state of charge (for example, a predetermined third state of charge (SOC3) in the embodiment) which is greater than the predetermined first state of charge, and wherein the controller may operate the abnormal rotating electric machine in a regenerative mode when the rotation number is smaller than the predetermined rotation number, the torque requirement is smaller than the predetermined torque, and the state of charge is smaller than the predetermined third state of charge.

(5) In the vehicle control device according to the aspect of the above-mentioned (1), wherein the controller may operate the abnormal rotating electric machine in a power mode when the rotation number is equal to or greater than a predetermined rotation number (for example, a predetermined rotation number (Nt) in the embodiment), the torque requirement is equal to or greater than a predetermined torque (for example, a predetermined torque (Tt) in the embodiment), and the state of charge is equal to or greater than a predetermined state of charge (for example, a predetermined second state of charge (SOC2) in the embodiment), and wherein the controller may stop the abnormal rotating electric machine or reduce the torque of the abnormal rotating electric machine to zero when the rotation number is equal to or greater than the predetermined rotation number, the torque requirement is equal to or greater than the predetermined torque, and the state of charge is smaller than the predetermined state of charge.

(6) In the vehicle control device according to the aspect of the above-mentioned (1), the controller may reduce the torque of the abnormal rotating electric machine to zero when the rotation number is equal to or greater than a predetermined rotation number (for example, a predetermined rotation number (Nt) in the embodiment), the torque requirement is smaller than a predetermined torque (for example, a predetermined torque (Tt) in the embodiment), and the state of charge is equal to or greater than a predetermined state of charge (for example, a predetermined third state of charge (SOC3) in the embodiment), and wherein the controller may operate the abnormal rotating electric machine in a regenerative mode when the rotation number is equal to or greater than the predetermined rotation number, the torque requirement is smaller than the predetermined torque, and the state of charge is smaller than the predetermined state of charge. Control of reducing the output of the abnormal rotating electric machine to zero may be performed when making the torque zero, or controlling phase current of the rotating electric machine may be realized using the electric power controller. In addition, driving (powering) and regeneration are repeated instantaneously or in the short term, but total zero electric power may be achieved over a long period of time.

(7) In the vehicle control device according to the aspect of the above-mentioned (1), wherein the controller may operate the abnormal rotating electric machine in a power mode when the rotation number is equal to or greater than a predetermined rotation number (for example, a predetermined rotation number (Nt) in the embodiment), the torque requirement is equal to or greater than a predetermined torque (for example, a predetermined torque (Tt) in the embodiment), and the state of charge is equal to or greater than a predetermined first state of charge (for example, a predetermined first state of charge (SOC1) in the embodiment), wherein the controller may reduce the torque of the abnormal rotating electric machine to zero when the rotation number is equal to or greater than the predetermined rotation number, the torque requirement is equal to or greater than the predetermined torque, and the state of charge is smaller than the predetermined first state of charge and equal to or greater than a predetermined second state of charge (for example, a predetermined second state of charge (SOC2) in the embodiment) smaller than the predetermined first state of charge, wherein the controller may stop the abnormal rotating electric machine or reduce a rotation number of the rotating electric machine to be smaller than the predetermined rotation number when the rotation number is equal to or greater than the predetermined rotation number, the torque requirement is equal to or greater than the predetermined torque, and the state of charge is smaller than the predetermined second state of charge, wherein the controller may reduce the torque of the abnormal rotating electric machine to zero when the rotation number is equal to or greater than the predetermined rotation number, the torque requirement is smaller than the predetermined torque, and the state of charge is equal to or greater than a predetermined third state of charge (for example, a predetermined third state of charge (SOC3) in the embodiment) greater than the predetermined first state of charge, and wherein the controller may operate the abnormal rotating electric machine in a regenerative mode when the rotation number is equal to or greater than the predetermined rotation number, the torque requirement is smaller than the predetermined torque, and the state of charge is smaller than the predetermined third state of charge.

(8) In the vehicle control device according to the aspect of the above-mentioned (4) or (7), the power storage device may be in an overcharging state when the state of charge is equal to or greater than the predetermined third state of charge, and the power storage device may be in an overdischarge state when the state of charge is smaller than the predetermined second state of charge.

(9) A vehicle control method according to an aspect of the present invention is a vehicle control method executed by a controller (for example, a processing part (13) in an embodiment) configured to control a plurality of power units (for example, power units (11) in the embodiment) mounted on a vehicle (for example, a fuel cell vehicle (1) in the embodiment), each of the plurality of power units including: a rotating electric machine (for example, a first rotating electric machine (21*a*) and a second rotating electric machine (21*b*) in the embodiment) configured to exchange torque with wheels (for example, driving wheels (W) in the embodiment); a power storage device (for example, a first power storage device (25*a*) and a second power storage device (25*b*) in the embodiment) and a fuel cell (for example, a first fuel cell (23*a*) and a second fuel cell (23*b*) in the embodiment), which are power sources; and an electric power controller (for example, a first electric power controller (27*a*) and a second electric power controller (27*b*) in the embodiment) configured to control electric power transmission of the rotating electric machine, the power storage device and the fuel cell, the vehicle control method including: a step (for example, step S01 in the embodiment) of determining whether there is an abnormality of the fuel cell or not; and a step (for example, step S02 to step S04 in the embodiment) of controlling an operation of the rotating electric machine in the power unit having the abnormal fuel cell according to a state of charge (for example, a state of charge (SOC) in the embodiment) of the power storage device, a rotation number (for example, a rotation number (N) in the embodiment) of the rotating electric machine, and a torque requirement (for example, a torque requirement (TR) in the embodiment) of the vehicle in the power unit having the abnormal fuel cell.

According to the aspect of the above-mentioned (1), by providing the controller configured to control the operation of the abnormal rotating electric machine according to the state of charge of the power storage device, the rotation number of the rotating electric machine and the torque requirement of the vehicle in the power unit having the abnormal fuel cell, it is possible to secure desired traveling safety while increasing an available traveling distance in the event of an abnormality.

In the case of the aspect of the above-mentioned (2), the torque requirement of the predetermined torque or more can be secured by the powering operation of the abnormal rotating electric machine when the state of charge is equal to or greater than the predetermined state of charge. A decrease in the state of charge can be suppressed by stopping the abnormal rotating electric machine or reducing the torque to zero when the state of charge is smaller than the predetermined state of charge.

In the case of the aspect of the above-mentioned (3), a decrease in the state of charge can be suppressed by stopping the abnormal rotating electric machine and reducing the torque to zero when the state of charge is equal to or greater than the predetermined state of charge. When the state of charge is smaller than the predetermined state of charge, the state of charge can be increased by the regenerative operation of the abnormal rotating electric machine.

In the case of the aspect of the above-mentioned (4), the torque requirement of the predetermined torque or more can be secured by the powering operation of the abnormal rotating electric machine. A decrease in the state of charge can be suppressed by stopping the abnormal rotating electric machine when the state of charge is smaller than the predetermined first state of charge. Occurrence of a counter electromotive voltage can be suppressed by allowing a slight decrease in the state of charge by reducing the torque of the abnormal rotating electric machine to zero when the state of charge is smaller than the predetermined first state of charge. A decrease in the state of charge can be suppressed while securing the torque requirement which is less than the predetermined torque by stopping the abnormal rotating electric machine or reducing the torque to zero when the state of charge is equal to or greater than the predetermined third state of charge. The state of charge can be increased while securing the torque requirement which is less than the predetermined torque by the regenerative operation of the abnormal rotating electric machine when the state of charge is smaller than the predetermined third state of charge.

In the case of the aspect of the above-mentioned (5), the torque requirement of the predetermined torque or more can be secured by the powering operation of the abnormal rotating electric machine when the state of charge is equal to or greater than the predetermined state of charge. A decrease in the state of charge can be suppressed by stopping the abnormal rotating electric machine or reducing the torque to zero when the state of charge is smaller than the predetermined state of charge.

In the case of the aspect of the above-mentioned (6), occurrence of the counter electromotive voltage can be suppressed by reducing the torque of the abnormal rotating electric machine to zero when the state of charge is equal to or greater than the predetermined state of charge. The state of charge can be increased by the regenerative operation of the abnormal rotating electric machine when the state of charge is smaller than the predetermined state of charge.

In the case of the aspect of the above-mentioned (7), the torque requirement of the predetermined torque or more can be secured by the powering operation of the abnormal rotating electric machine. A decrease in the state of charge can be suppressed by stopping the abnormal rotating electric machine or regulating the rotation number when the state of charge is smaller than the predetermined first state of charge. Occurrence of the counter electromotive voltage can be suppressed while allowing a slight decrease in the state of charge by reducing the torque of the abnormal rotating electric machine to zero when the state of charge is smaller than the predetermined first state of charge. Occurrence of the counter electromotive voltage can be suppressed while securing the torque requirement which is less than the predetermined torque by reducing the torque of the abnormal rotating electric machine to zero when the state of charge is equal to or greater than the predetermined third state of charge. The state of charge can be increased while securing the torque requirement which is less than the predetermined torque by the regenerative operation of the abnormal rotating electric machine when the state of charge is smaller than the predetermined third state of charge.

In the case of the aspect of the above-mentioned (8), a decrease in the state of charge in an over-discharge state can be suppressed while securing the torque requirement in an overcharging state.

According to the aspect of the above-mentioned (9), desired traveling safety can be secured while increasing an available traveling distance in the event of an abnormality by controlling the operation of the abnormal rotating electric machine according to the state of charge of the power storage device, the rotation number of the rotating electric machine, and the torque requirement of the vehicle in the power unit having the abnormal fuel cell.

DETAILED DESCRIPTION OF THE INVENTION

Hereinafter, a vehicle control device and a vehicle control method according to an embodiment of the present invention will be described with reference to the accompanying drawings.

Figure 1:
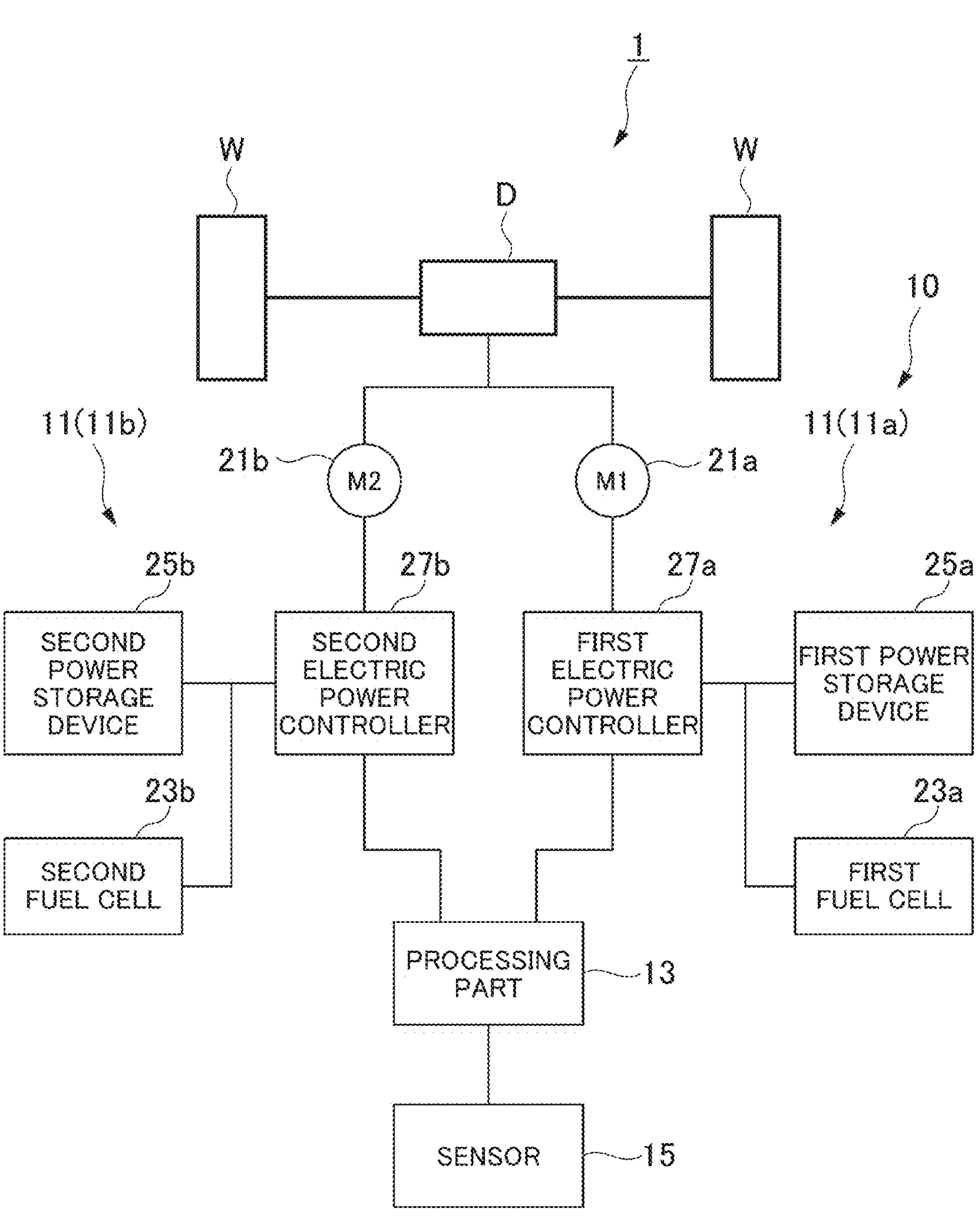
FIG. 1 is a configuration view of a fuel cell vehicle on which a vehicle control device of an embodiment of the present invention is mounted.

FIG. 1 is a configuration view of a fuel cell vehicle 1 on which a vehicle control device 10 of the embodiment is mounted.

As shown in FIG. 1, the vehicle control device 10 mounted on the fuel cell vehicle 1 includes, for example, a plurality of power units 11, a processing part 13 configured to control the plurality of power units 11, and a sensor 15.

The plurality of power units 11 are, for example, a first power unit 11*a* and a second power unit 11*b*. The plurality of power units 11 are directly connected to each other, and for example, are connected to driving wheels W via a differential mechanism D. The configurations of the plurality of power units 11 are, for example, identical to each other.

The first power unit 11*a* includes, for example, a first rotating electric machine 21*a*, a first fuel cell 23*a*, a first power storage device 25*a*, and a first electric power controller 27*a*.

The second power unit 11*b* includes, for example, a second rotating electric machine 21*b*, a second fuel cell 23*b*, a second power storage device 25*b*, and a second electric power controller 27*b*.

Each of the rotating electric machines 21*a* and 21*b* is, for example, a 3-phase alternating current brushless DC motor or the like. Each of the rotating electric machines 21*a* and 21*b* exchanges, for example, a torque with the driving wheels W via the differential mechanism D. The rotating electric machines 21*a* and 21*b* are connected to the electric power controllers 27*a* and 27*b*, respectively.

Each of the fuel cells 23*a* and 23*b* is, for example, a solid polymer type fuel cell, a solid oxide type fuel cell, or the like, which is a power source of the fuel cell vehicle 1. Each of the fuel cells 23*a* and 23*b* constitutes, for example, each fuel cell system, together with each supply part of fuel and oxidant, a discharge part of exhaust and drainage, various sensors, and the like. Each of the fuel cells 23*a* and 23*b* is connected to, for example, each of the power storage devices 25*a* and 25*b* and each of the electric power controllers 27*a* and 27*b*.

Each of the power storage devices 25*a* and 25*b* is, for example, a high voltage battery or the like, which is a power source of the fuel cell vehicle 1. Each of the power storage devices 25*a* and 25*b* is connected to, for example, each of the fuel cells 23*a* and 23*b* and each of the electric power controllers 27*a* and 27*b*. Each of the power storage devices 25*a* and 25*b* is charged by, for example, each of the fuel cells 23*a* and 23*b*, and exchange electric power with each of the rotating electric machines 21*a* and 21*b* via each of the electric power controllers 27*a* and 27*b*.

Each of the electric power controllers 27*a* and 27*b* includes, for example, an electric power conversion module formed by a plurality of switching elements, a rectifying element, and the like. Each of the electric power controllers 27*a* and 27*b* controls, for example, power transmission between each of the power storage devices 25*a* and 25*b* or each of the fuel cells 23*a* and 23*b* and each of the rotating electric machines 21*a* and 21*b* by bidirectional electric power conversion between direct current electric power and alternating current electric power.

The processing part 13 is, for example, a software function part that functioned by executing a predetermined program using a processor such as a central processing unit (CPU) or the like. The software function part is an ECU including a processor such as a CPU or the like, a read only memory (ROM) configured to store a program, a random access memory (RAM) configured to temporarily store data, and an electronic circuit such as a timer or the like. Further, at least a part of the processing part 13 may be an integrated circuit such as large scale integration (LSI) or the like.

For example, the processing part 13 acquires a signal of a detected value output from the various sensors 15. The various sensors 15 includes, for example, an operation amount sensor configured to detect existence of an operation and an operation amount of each of an accelerator operator and a brake operator by a driver in the fuel cell vehicle 1, a current sensor, a voltage sensor and a temperature sensor in each of the rotating electric machines 21*a* and 21*b* and each of the power storage devices 25*a* and 25*b*, a rotation angle sensor of each of the rotating electric machines 21*a* and 21*b*, a pressure sensor and a flow rate sensor of each fuel cell system, and the like.

The processing part 13 controls, for example, each of the first power unit 11*a* and the second power unit 11*b* on the basis of the signals of the detected values output from the various sensors 15. For example, if an abnormality occurs in the fuel cell system of any of the power units 11, the processing part 13 controls an operation of each of the rotating electric machines 21*a* and 21*b* of each the power units 11 according to a state of charge of the power storage device (25*a* or 25*b*) and a rotation number of the rotating electric machine (21*a* or 21*b*) of the abnormal power unit 11, and a torque requirement of the fuel cell vehicle 1.

Hereinafter, an operation of the vehicle control device 10 of the embodiment, i.e., an example of a vehicle control method will be described.

Figure 2:
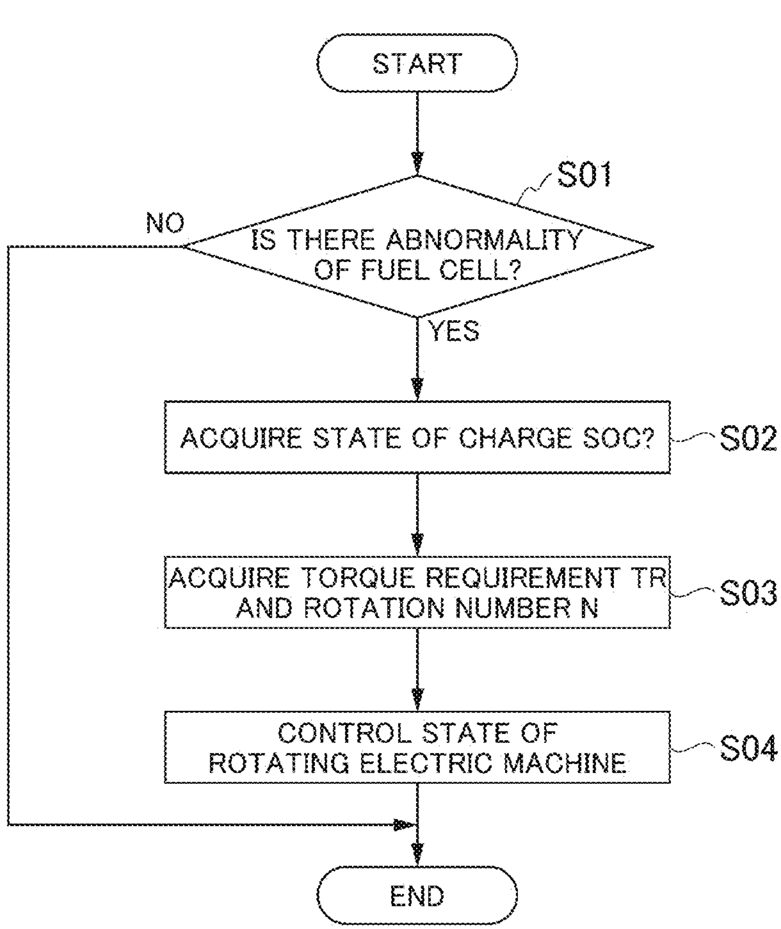
FIG. 2 is a flowchart showing an operation of the vehicle control device of the embodiment of the present invention.

FIG. 2 is a flowchart showing an operation of the vehicle control device 10 of the embodiment.

As shown in FIG. 2, first, the processing part 13 determines whether there is an abnormality in the fuel cell system of any of the power units 11 (step S01).

When the determination result is "NO," the processing part 13 advances the processing to end.

Meanwhile, when the determination result is "YES," the processing part 13 advances the processing to step S02.

Next, the processing part 13 acquires, for example, a state of charge SOC of the power storage device (the first power storage device 25*a* or the second power storage device 25*b*) in the abnormal power unit 11 on the basis of the signals output from the current sensor, the voltage sensor, the temperature sensor, and the like, of the sensor 15 (step S02).

Next, the processing part 13 acquires, for example, a torque requirement TR of the fuel cell vehicle 1 according to requirements of a driver or predetermined control based on the signal or the like output from the operation amount sensor of the sensor 15. The processing part 13 acquires, for example, a rotation number N of the rotating electric machine (the first rotating electric machine 21*a* or the second rotating electric machine 21*b*) in the abnormal power unit 11 based on the signal output from the rotation angle sensor or the like of the sensor 15 (step S03).

Next, the processing part 13 controls, for example, an operation of each of the rotating electric machines 21*a* and 21*b* of each of the power units 11 according to the state of charge SOC and the rotation number N in the abnormal power unit 11 and the torque requirement TR of the fuel cell vehicle 1 (step S04). Then, the processing part 13 advances the processing to end.

For example, as shown in the following table 1, the processing part 13 instructs a predetermined operation state to the rotating electric machine (the first rotating electric machine 21*a* or the second rotating electric machine 21*b*) of the abnormal power unit 11.

TABLE 1

| Rotation Number | Torque Requirement | SD (High SOC) | SC (Middle SOC) | SB (Low SOC) | SA (Extremely Low SOC) |
|---|---|---|---|---|---|
| NA (Low Rotation Number) | High Torque | Drive | Drive | Stop or Zero Torque | Stop |
| | Low Torque | Stop or Zero Torque | Regeneration | Regeneration | Regeneration |
| NB (High Rotation Number) | High Torque | Drive | Drive | Zero Torque | Stop or Regulate Rotation Number |
| | Low Torque | Zero Torque | Regeneration | Regeneration | Regeneration |

Figure 3:
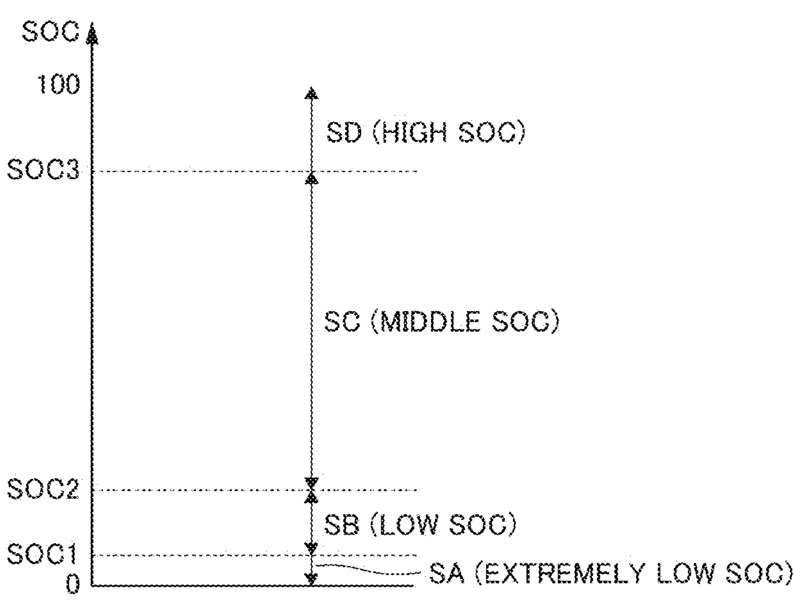
FIG. 3 is a view showing area setting of a state of charge of a power storage device by the vehicle control device of the embodiment of the present invention.
Figure 4:
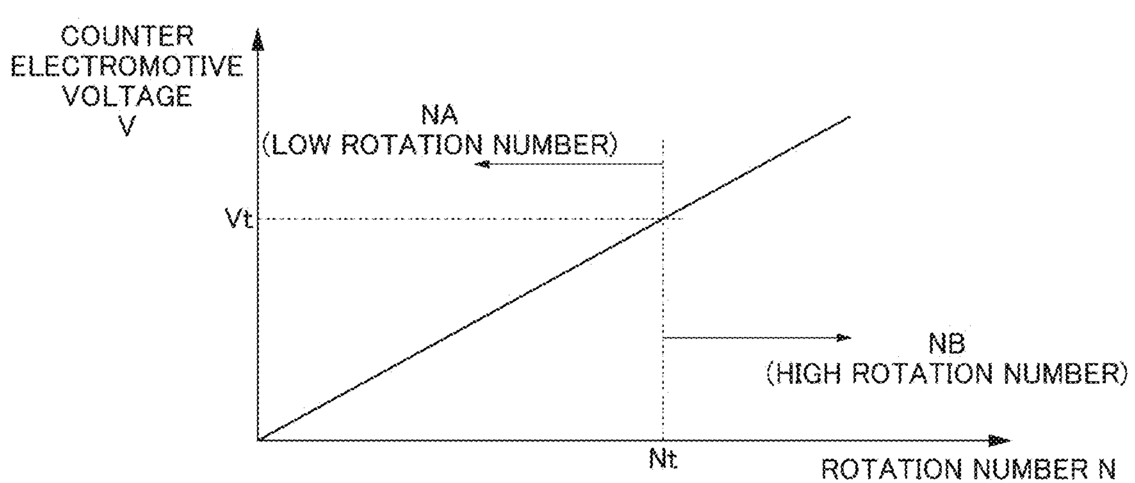
FIG. 4 is a view showing area setting of a rotation number of a rotating electric machine by the vehicle control device of the embodiment of the present invention.

FIG. 3 is a view showing area setting of the state of charge SOC of each of the power storage devices 25*a* and 25*b* by the vehicle control device 10 of the embodiment. FIG. 4 is a view showing area setting of the rotation number N of each of the rotating electric machines 21*a* and 21*b* by the vehicle control device 10 of the embodiment.

As shown in FIG. 3, the processing part 13 sets, for example, a first state of charge area SA, a second state of charge area SB, a third state of charge area SC and a fourth state of charge area SD according to a predetermined first state of charge SOC1, a predetermined second state of charge SOC2 and a predetermined third state of charge SOC3.

The predetermined first state of charge SOC1 is, for example, a state of charge near zero. The first state of charge area SA is, for example, an area of an extremely low state of charge (extremely low SOC) that is lower than the predetermined first state of charge SOC1 among the over-discharge states.

The predetermined second state of charge SOC2 is greater than the predetermined first state of charge SOC1, and for example, a threshold state of charge that determines whether each of the power storage devices 25*a* and 25*b* is in an over-discharge state. The second state of charge area SB is, for example, an area of a low state of charge (low SOC) other than the first state of charge area SA, which is equal to or greater than the predetermined first state of charge SOC1 and smaller than the predetermined second state of charge SOC2, in the over-discharge state.

The predetermined third state of charge SOC3 is greater than the predetermined second state of charge SOC2, and for example, a threshold state of charge that determines each of the power storage devices 25*a* and 25*b* is in the overcharging state. The third state of charge area SC is, for example, an area of about a middle state of charge (middle SOC) between an over-discharge state and an overcharging state, which is equal to or greater than the predetermined second state of charge SOC2 and smaller than the predetermined third state of charge SOC3. The fourth state of charge area SD is, for example, an area of a high state of charge (high SOC) that is an overcharging state greater than the predetermined third state of charge SOC3.

As shown in FIG. 4, the processing part 13 sets, for example, a first rotation number area NA and a second rotation number area NB according to a predetermined rotation number Nt.

The predetermined rotation number Nt is set on the basis of a counter electromotive voltage V that changes to an increasing trend according to, for example, an increase in the rotation number N of each of the rotating electric machines 21*a* and 21*b*. The predetermined rotation number Nt is, for example, the rotation number N corresponding to a predetermined counter electromotive voltage Vt equivalent to a withstand voltage of an electrical device connected to each of the rotating electric machines 21*a* and 21*b*. The first rotation number area NA is, for example, an area of the low rotation number N (low rotation number) smaller than the predetermined rotation number Nt. The second rotation number area NB is, for example, an area of a high rotation number N (high rotation number) equal to or greater than the predetermined rotation number Nt.

The processing part 13 operates an abnormal rotating electric machine (21*a* or 21*b*) in a power mode, for example, when the rotation number N is smaller than the predetermined rotation number Nt (the first rotation number area NA), the torque requirement TR is equal to or greater than a predetermined torque Tt, and the state of charge SOC is equal to or greater than the predetermined second state of charge SOC2 (the third state of charge area SC and the fourth state of charge area SD). The predetermined torque Tt is, for example, the torque that each of the rotating electric machines 21*a* and 21*b* can output individually.

The processing part 13 stops the abnormal rotating electric machine (21*a* or 21*b*) or reduces the torque of the abnormal rotating electric machine (21*a* or 21*b*) to zero, for example, when the rotation number N is smaller than the predetermined rotation number Nt (the first rotation number area NA), the torque requirement TR is equal to or greater than the predetermined torque Tt, and the state of charge SOC is smaller than the predetermined second state of charge SOC2 and equal to or greater than the predetermined first state of charge SOC1 (the second state of charge area SB).

Stoppage of each of the rotating electric machines 21*a* and 21*b* is a state in which each of the rotating electric machines 21*a* and 21*b* is de-energized, and a state in which a counter electromotive voltage is generated due to the drag when an external force is applied. The state in which the torque of each of the rotating electric machines 21*a* and 21*b* is zero is, for example, a state in which each of the rotating electric machines 21_a_ and 21_b_ is energized so that the torque of each machine becomes zero.

The processing part 13 stops the abnormal rotating electric machine (21_a_ or 21_b_), for example, when the rotation number N is smaller than the predetermined rotation number Nt (the first rotation number area NA), the torque requirement TR is equal to or greater than the predetermined torque Tt, and the state of charge SOC is smaller than the predetermined first state of charge SOC1 (the first state of charge area SA).

The processing part 13 stops the abnormal rotating electric machine (21_a_ or 21_b_) or reduces the torque of the abnormal rotating electric machine (21_a_ or 21_b_) to zero, for example, when the rotation number N is smaller than the predetermined rotation number Nt (the first rotation number area NA), the torque requirement TR is smaller than the predetermined torque Tt, and the state of charge SOC is equal to or greater than the predetermined third state of charge SOC3 (the fourth state of charge area SD).

The processing part 13 operates the abnormal rotating electric machine (21_a_ or 21_b_) in a regenerative mode, for example, when the rotation number N is smaller than the predetermined rotation number Nt (the first rotation number area NA), the torque requirement TR is smaller than the predetermined torque Tt, and the state of charge SOC is smaller than the predetermined third state of charge SOC3 (the first state of charge area SA, the second state of charge area SB and the third state of charge area SC). The processing part 13 secures the electric power required for the powering operation of the normal rotating electric machine (21_a_ or 21_b_) and for charging the abnormal power storage device (25_a_ or 25_b_) by, for example, increasing the output of the normal fuel cell (23_a_ or 23_b_).

The processing part 13 operates the abnormal rotating electric machine (21_a_ or 21_b_) in a power mode, for example, when the rotation number N is equal to or greater than the predetermined rotation number Nt (the second rotation number area NB), the torque requirement TR is equal to or greater than the predetermined torque Tt, and the state of charge SOC is equal to or greater than the predetermined second state of charge SOC2 (the third state of charge area SC and the fourth state of charge area SD).

The processing part 13 reduces the torque of the abnormal rotating electric machine (21_a_ or 21_b_) to zero, for example, when the rotation number N is equal to or greater than the predetermined rotation number Nt (the second rotation number area NB), the torque requirement TR is equal to or greater than the predetermined torque Tt, and the state of charge SOC is smaller than the predetermined second state of charge SOC2 and equal to or greater than the predetermined first state of charge SOC1 (the second state of charge area SB).

The processing part 13 stops the abnormal rotating electric machine (21_a_ or 21_b_) or regulates the rotation number N of each of the rotating electric machines 21_a_ and 21_b_ to be smaller than the predetermined rotation number Nt, for example, when the rotation number N is equal to or greater than the predetermined rotation number Nt (the second rotation number area NB), the torque requirement TR is equal to or greater than the predetermined torque Tt, and the state of charge SOC is smaller than the predetermined first state of charge SOC1 (the first state of charge area SA).

The processing part 13 reduces the torque of the abnormal rotating electric machine (21_a_ or 21_b_) to zero, for example, when the rotation number N is equal to or greater than the predetermined rotation number Nt (the second rotation number area NB), the torque requirement TR is smaller than the predetermined torque Tt, and the state of charge SOC is equal to or greater than the predetermined third state of charge SOC3 (the fourth state of charge area SD).

The processing part 13 operates the abnormal rotating electric machine (21_a_ or 21_b_) in a regenerative state, for example, when the rotation number N is equal to or greater than the predetermined rotation number Nt (the second rotation number area NB), the torque requirement TR is smaller than the predetermined torque Tt, and the state of charge SOC is smaller than the predetermined third state of charge SOC3 (the first state of charge area SA, the second state of charge area SB and the third state of charge area SC). The processing part 13 secures electric power required for the powering operation of the normal rotating electric machine (21_a_ or 21_b_) and charging of the abnormal power storage device (25_a_ or 25_b_) by, for example, increasing the output of the normal fuel cell (23_a_ or 23_b_).

As described above, according to the vehicle control device 10 and the vehicle control method of the embodiment, according to the state of charge SOC, the rotation number N and the torque requirement TR in the abnormal power unit 11, it is possible to secure desired traveling safety while increasing the available traveling distance during abnormal conditions by controlling the operation of the rotating electric machine (the first rotating electric machine 21_a_ or the second rotating electric machine 21_b_) of the abnormal power unit 11.

It is possible to secure the torque requirement TR equal to or greater than the predetermined torque Tt by the powering operation of the abnormal rotating electric machine (21_a_ or 21_b_) in the third state of charge area SC and the fourth state of charge area SD.

It is possible to suppress a decrease in the state of charge SOC while allowing occurrence of the counter electromotive voltage by stopping the abnormal rotating electric machine (21_a_ or 21_b_) in the first state of charge area SA and the second state of charge area SB.

It is possible to suppress an increase in the counter electromotive voltage and a decrease in the state of charge SOC by regulating the rotation number N of the abnormal rotating electric machine (21_a_ or 21_b_) in the first state of charge area SA.

It is possible to suppress occurrence of the counter electromotive voltage while allowing a slight decrease in the state of charge SOC by making the torque of the abnormal rotating electric machine (21_a_ or 21_b_) zero in the second state of charge area SB.

It is possible to suppress a decrease in the state of charge SOC while securing the torque requirement TR smaller than the predetermined torque Tt and allowing occurrence of a slight counter electromotive voltage by stopping the abnormal rotating electric machine (21_a_ or 21_b_) in the fourth state of charge area SD.

It is possible to suppress occurrence of the counter electromotive voltage while securing the torque requirement TR smaller than the predetermined torque Tt by making the torque of the abnormal rotating electric machine (21_a_ or 21_b_) in the fourth state of charge area SD zero.

It is possible to increase the state of charge SOC while securing the torque requirement TR smaller than the predetermined torque Tt by the regenerative operation of the abnormal rotating electric machine (21_a_ or 21_b_) in the first state of charge area SA, the second state of charge area SB and the third state of charge area SC.

(Variant)

Hereinafter, a variant of the embodiment will be described. Further, the same parts as the above-mentioned embodiment are designated by the same reference signs and description thereof will be omitted or simplified.

In the above-mentioned embodiment, while the plurality of power units 11 are connected to the driving wheels W via the differential mechanism D, there is no limitation thereto. For example, each of the power units 11 may be connected to each of the driving wheels W directly or via a disconnection mechanism such as a clutch or the like.

In the above-mentioned embodiment, while each of the fuel cells 23*a* and 23*b* constitutes each fuel cell system, there is no limitation thereto. For example, each of the fuel cells 23*a* and 23*b* may constitute a fuel cell system that shares fuel and oxidant supply parts and exhaust and drainage discharge parts.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control device comprising:

a plurality of power units mounted on a vehicle; and a controller configured to control the plurality of power units, wherein each of the plurality of power units includes:

a rotating electric machine configured to exchange torque with wheels;

a power storage device and a fuel cell, which are power sources; and an electric power controller configured to control electric power transmission of the rotating electric machine, the power storage device and the fuel cell, and wherein the controller is further configured to:

determine that an abnormality has occurred in the fuel cell of a power unit of the plurality of power units, resulting in a determination of an abnormal fuel cell, and based on the determination of the abnormal fuel cell, control an operation of an abnormal rotating electric machine, which is the rotating electric machine having the abnormal fuel cell, wherein the control of the operation of the abnormal rotating electric machine operates the abnormal rotating electric machine in a power mode when a rotation number is smaller than a predetermined rotation number, a torque requirement is equal to or greater than a predetermined torque, and a state of charge is equal to or greater than a predetermined state of charge, and the control of the operation of the abnormal rotating electric machine stops the abnormal rotating electric machine or reduces the torque of the abnormal rotating electric machine to zero when the rotation number is smaller than the predetermined rotation number, the torque requirement is equal to or greater than the predetermined torque, and the state of charge is smaller than the predetermined state of charge based on the state of charge of the power storage device in the power unit having the abnormal fuel cell, the rotation number of the abnormal rotating electric machine, and the torque requirement of the vehicle.

2. The vehicle control device according to claim 1, wherein the controller operates the abnormal rotating electric machine in the power mode when the rotation number is smaller than the predetermined rotation number, the torque requirement is equal to or greater than the predetermined torque, and the state of charge is equal to or greater than a predetermined first state of charge, wherein the controller stops the abnormal rotating electric machine or reduces the torque of the abnormal rotating electric machine to zero when the rotation number is smaller than the predetermined rotation number, the torque requirement is equal to or greater than the predetermined torque, and the state of charge is smaller than the predetermined first state of charge and is equal to or greater than a predetermined second state of charge which is smaller than the predetermined first state of charge, wherein the controller stops the abnormal rotating electric machine when the rotation number is smaller than the predetermined rotation number, the torque requirement is equal to or greater than the predetermined torque, and the state of charge is smaller than the predetermined second state of charge, wherein the controller stops the abnormal rotating electric machine or reduces the torque of the abnormal rotating electric machine to zero when the rotation number is smaller than the predetermined rotation number, the torque requirement is smaller than the predetermined torque, and the state of charge is equal to or greater than a predetermined third state of charge which is greater than the predetermined first state of charge, and wherein the controller operates the abnormal rotating electric machine in a regenerative mode when the rotation number is smaller than the predetermined rotation number, the torque requirement is smaller than the predetermined torque, and the state of charge is smaller than the predetermined third state of charge.

3. The vehicle control device according to claim 2, wherein the power storage device is in an overcharging state when the state of charge is equal to or greater than the predetermined third state of charge, and the power storage device is in an over-discharge state when the state of charge is smaller than the predetermined second state of charge.

4. A vehicle control device comprising:

a plurality of power units mounted on a vehicle; and a controller configured to control the plurality of power units, wherein each of the plurality of power units includes:

a rotating electric machine configured to exchange torque with wheels;

a power storage device and a fuel cell, which are power sources; and an electric power controller configured to control electric power transmission of the rotating electric machine, the power storage device and the fuel cell, and wherein the controller is further configured to:

determine that an abnormality has occurred in the fuel cell of a power unit of the plurality of power units, resulting in a determination of an abnormal fuel cell, and based on the determination of the abnormal fuel cell, control an operation of an abnormal rotating electric machine, which is the rotating electric machine having the abnormal fuel cell, wherein the control of the operation of the abnormal rotating electric machine stops the abnormal rotating electric machine or reduces the torque of the abnormal rotating electric machine to zero when a rotation number is smaller than a predetermined rotation number, a torque requirement is smaller than a predetermined torque, and a state of charge is equal to or greater than a predetermined state of charge, and the control of the operation of the abnormal rotating electric machine operates the abnormal rotating electric machine in a regenerative mode when the rotation number is smaller than the predetermined rotation number, the torque requirement is smaller than the predetermined torque, and the state of charge is smaller than the predetermined state of charge, based on the state of charge of the power storage device in the power unit having the abnormal fuel cell, the rotation number of the abnormal rotating electric machine, and the torque requirement of the vehicle.

5. The vehicle control device according to claim 4, wherein the controller operates the abnormal rotating electric machine in a power mode when the rotation number is smaller than the predetermined rotation number, the torque requirement is equal to or greater than the predetermined torque, and the state of charge is equal to or greater than a predetermined first state of charge, wherein the controller stops the abnormal rotating electric machine or reduces the torque of the abnormal rotating electric machine to zero when the rotation number is smaller than the predetermined rotation number, the torque requirement is equal to or greater than the predetermined torque, and the state of charge is smaller than the predetermined first state of charge and is equal to or greater than a predetermined second state of charge which is smaller than the predetermined first state of charge, wherein the controller stops the abnormal rotating electric machine when the rotation number is smaller than the predetermined rotation number, the torque requirement is equal to or greater than the predetermined torque, and the state of charge is smaller than the predetermined second state of charge, wherein the controller stops the abnormal rotating electric machine or reduces the torque of the abnormal rotating electric machine to zero when the rotation number is smaller than the predetermined rotation number, the torque requirement is smaller than the predetermined torque, and the state of charge is equal to or greater than a predetermined third state of charge which is greater than the predetermined first state of charge, and wherein the controller operates the abnormal rotating electric machine in the regenerative mode when the rotation number is smaller than the predetermined rotation number, the torque requirement is smaller than the predetermined torque, and the state of charge is smaller than the predetermined third state of charge.

6. The vehicle control device according to claim 5, wherein the power storage device is in an overcharging state when the state of charge is equal to or greater than the predetermined third state of charge, and the power storage device is in an over-discharge state when the state of charge is smaller than the predetermined second state of charge.

7. A vehicle control device comprising:

a plurality of power units mounted on a vehicle; and a controller configured to control the plurality of power units, wherein each of the plurality of power units includes:

a rotating electric machine configured to exchange torque with wheels;

a power storage device and a fuel cell, which are power sources; and an electric power controller configured to control electric power transmission of the rotating electric machine, the power storage device and the fuel cell, and wherein the controller is further configured to:

determine that an abnormality has occurred in the fuel cell of a power unit of the plurality of power units, resulting in a determination of an abnormal fuel cell, and based on the determination of the abnormal fuel cell, control an operation of an abnormal rotating electric machine, which is the rotating electric machine having the abnormal fuel cell, wherein the control of the operation of the abnormal rotating electric machine operates the abnormal rotating electric machine in a power mode when a rotation number is equal to or greater than a predetermined rotation number, a torque requirement is equal to or greater than a predetermined torque, and a state of charge is equal to or greater than a predetermined state of charge, and the control of the operation of the abnormal rotating electric machine stops the abnormal rotating electric machine or reduces the torque of the abnormal rotating electric machine to zero when the rotation number is equal to or greater than the predetermined rotation number, the torque requirement is equal to or greater than the predetermined torque, and the state of charge is smaller than the predetermined state of charge, based on the state of charge of the power storage device in the power unit having the abnormal fuel cell, the rotation number of the abnormal rotating electric machine, and the torque requirement of the vehicle.

8. The vehicle control device according to claim 7, wherein the controller operates the abnormal rotating electric machine in the power mode when the rotation number is equal to or greater than the predetermined rotation number, the torque requirement is equal to or greater than the predetermined torque, and the state of charge is equal to or greater than a predetermined first state of charge, wherein the controller reduces the torque of the abnormal rotating electric machine to zero when the rotation number is equal to or greater than the predetermined rotation number, the torque requirement is equal to or greater than the predetermined torque, and the state of charge is smaller than the predetermined first state of charge and equal to or greater than a predetermined second state of charge smaller than the predetermined first state of charge, wherein the controller stops the abnormal rotating electric machine or reduces the rotation number of the rotating electric machine to be smaller than the predetermined rotation number when the rotation number is equal to or greater than the predetermined rotation number, the torque requirement is equal to or greater than the predetermined torque, and the state of charge is smaller than the predetermined second state of charge, wherein the controller reduces the torque of the abnormal rotating electric machine to zero when the rotation number is equal to or greater than the predetermined rotation number, the torque requirement is smaller than the predetermined torque, and the state of charge is equal to or greater than a predetermined third state of charge greater than the predetermined first state of charge, and wherein the controller operates the abnormal rotating electric machine in a regenerative mode when the rotation number is equal to or greater than the predetermined rotation number, the torque requirement is smaller than the predetermined torque, and the state of charge is smaller than the predetermined third state of charge.

9. The vehicle control device according to claim 8, wherein the power storage device is in an overcharging state when the state of charge is equal to or greater than the predetermined third state of charge, and the power storage device is in an over-discharge state when the state of charge is smaller than the predetermined second state of charge.

10. A vehicle control device comprising:

a plurality of power units mounted on a vehicle; and a controller configured to control the plurality of power units, wherein each of the plurality of power units includes:

a rotating electric machine configured to exchange torque with wheels;

a power storage device and a fuel cell, which are power sources; and an electric power controller configured to control electric power transmission of the rotating electric machine, the power storage device and the fuel cell, and wherein the controller is further configured to:

determine that an abnormality has occurred in the fuel cell of a power unit of the plurality of power units, resulting in a determination of an abnormal fuel cell, and based on the determination of the abnormal fuel cell, control an operation of an abnormal rotating electric machine, which is the rotating electric machine having the abnormal fuel cell, wherein the control of the operation of the abnormal rotating electric machine reduces the torque of the abnormal rotating electric machine to zero when a rotation number is equal to or greater than a predetermined rotation number, a torque requirement is smaller than a predetermined torque, and a state of charge is equal to or greater than a predetermined state of charge, and the control of the operation of the abnormal rotating electric machine operates the abnormal rotating electric machine in a regenerative mode when the rotation number is equal to or greater than the predetermined rotation number, the torque requirement is smaller than the predetermined torque, and the state of charge is smaller than the predetermined state of charge, based on the state of charge of the power storage device in the power unit having the abnormal fuel cell, the rotation number of the abnormal rotating electric machine, and the torque requirement of the vehicle.

11. The vehicle control device according to claim 10, wherein the controller operates the abnormal rotating electric machine in a power mode when the rotation number is equal to or greater than the predetermined rotation number, the torque requirement is equal to or greater than the predetermined torque, and the state of charge is equal to or greater than a predetermined first state of charge, wherein the controller reduces the torque of the abnormal rotating electric machine to zero when the rotation number is equal to or greater than the predetermined rotation number, the torque requirement is equal to or greater than the predetermined torque, and the state of charge is smaller than the predetermined first state of charge and equal to or greater than a predetermined second state of charge smaller than the predetermined first state of charge, wherein the controller stops the abnormal rotating electric machine or reduces the rotation number of the rotating electric machine to be smaller than the predetermined rotation number when the rotation number is equal to or greater than the predetermined rotation number, the torque requirement is equal to or greater than the predetermined torque, and the state of charge is smaller than the predetermined second state of charge, wherein the controller reduces the torque of the abnormal rotating electric machine to zero when the rotation number is equal to or greater than the predetermined rotation number, the torque requirement is smaller than the predetermined torque, and the state of charge is equal to or greater than a predetermined third state of charge greater than the predetermined first state of charge, and wherein the controller operates the abnormal rotating electric machine in the regenerative mode when the rotation number is equal to or greater than the predetermined rotation number, the torque requirement is smaller than the predetermined torque, and the state of charge is smaller than the predetermined third state of charge.

12. The vehicle control device according to claim 11, wherein the power storage device is in an overcharging state when the state of charge is equal to or greater than the predetermined third state of charge, and the power storage device is in an over-discharge state when the state of charge is smaller than the predetermined second state of charge.

* * * * *